United States Patent
Hsiao et al.

(10) Patent No.: US 7,092,206 B2
(45) Date of Patent: Aug. 15, 2006

(54) MAGNETIC HEAD WITH MAGNETIC LAYERS OF DIFFERING WIDTHS AND THIRD POLE WITH REDUCED THICKNESS

(75) Inventors: Wen-Chien D. Hsiao, San Jose, CA (US); Hin P. E. Lee, San Jose, CA (US); Jyh-Shuey Lo, San Jose, CA (US); Yansheng Luo, Fremont, CA (US); Samuel W. Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 143 days.

(21) Appl. No.: 10/606,427

(22) Filed: Jun. 25, 2003

(65) Prior Publication Data

US 2004/0264046 A1    Dec. 30, 2004

(51) Int. Cl.
  *G11B 5/31*  (2006.01)
  *G11B 5/187*  (2006.01)
  *G11B 5/39*  (2006.01)

(52) U.S. Cl. ...................................... 360/126; 360/122

(58) Field of Classification Search ................ 360/126, 360/122, 317
  See application file for complete search history.

(56) References Cited

U.S. PATENT DOCUMENTS

| | | | |
|---|---|---|---|
| 4,404,609 A | 9/1983 | Jones, Jr. ...................... 360/126 |
| 4,825,318 A | 4/1989 | Hoo et al. .................... 360/121 |
| 5,075,956 A | 12/1991 | Das .............................. 29/603 |
| 5,283,942 A | 2/1994 | Chen et al. .................... 29/603 |
| 5,285,340 A * | 2/1994 | Ju et al. ...................... 360/126 |
| 5,436,778 A | 7/1995 | Lin et al. ..................... 360/113 |
| 5,488,968 A | 2/1996 | Price et al. ..................... 137/1 |
| 5,652,687 A * | 7/1997 | Chen et al. .................. 360/126 |
| 5,658,470 A | 8/1997 | Schultz et al. ................. 216/22 |
| 5,715,597 A | 2/1998 | Aylwin et al. ........... 29/603.08 |
| 5,729,410 A | 3/1998 | Fontana, Jr. et al. ........ 360/113 |
| 5,751,526 A | 5/1998 | Schemmel .................... 360/113 |
| 5,804,085 A | 9/1998 | Wu et al. ....................... 216/22 |
| 5,831,801 A * | 11/1998 | Shouji et al. ................ 360/126 |
| 5,863,448 A | 1/1999 | Otani et al. .................... 216/22 |
| 5,867,890 A | 2/1999 | Hsiao et al. ............. 29/603.14 |
| 5,901,432 A | 5/1999 | Armstrong et al. ...... 29/603.14 |
| 5,916,423 A | 6/1999 | Westwood ............. 204/192.32 |
| 5,916,424 A | 6/1999 | Libby et al. ........... 204/298.36 |
| 5,966,800 A * | 10/1999 | Huai et al. ............... 29/603.13 |
| 5,985,104 A | 11/1999 | Westwood ............. 204/192.15 |
| 6,004,437 A | 12/1999 | Lee et al. .............. 204/192.34 |
| 6,032,353 A * | 3/2000 | Hiner et al. ............. 29/603.14 |
| 6,151,193 A * | 11/2000 | Terunuma et al. .......... 360/126 |
| 6,239,948 B1 * | 5/2001 | Wu et al. ..................... 360/120 |
| 2002/0030930 A1 * | 3/2002 | Matono et al. ............. 360/126 |

* cited by examiner

Primary Examiner—Craig A. Renner
(74) Attorney, Agent, or Firm—Zilka-Kotab, PC

(57) ABSTRACT

A magnetic head includes a magnetic write structure having a first magnetic layer having a first pole, a second magnetic layer having a second pole spaced apart from the first pole, and a third magnetic layer having a third pole contacting the second pole. The third pole has a third-pole width greater than a second-pole width. An inductive coil positioned adjacent to the third magnetic layer controllably magnetizes the third magnetic layer. The third magnetic layer is non-uniformly thick such that a thickness of the third pole is less than a thickness of the third magnetic layer at locations in registry with the inductive coil. The magnetic write structure is conveniently fabricated by depositing the magnetic layers and the inductive coil, masking the third magnetic layer other than the third pole, and removing a portion of the thickness of the third pole.

9 Claims, 5 Drawing Sheets

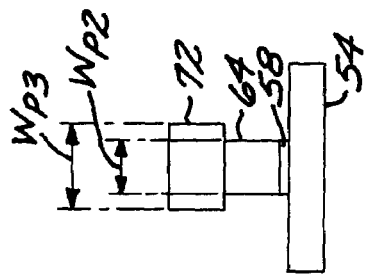
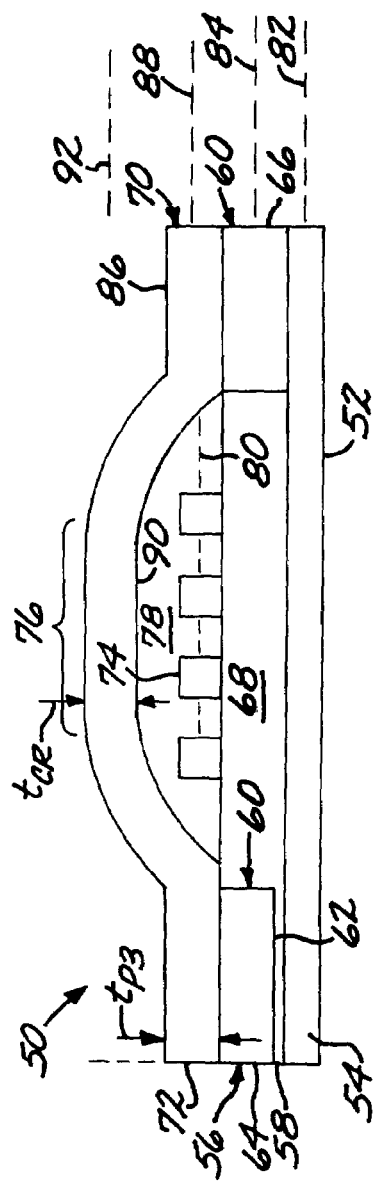
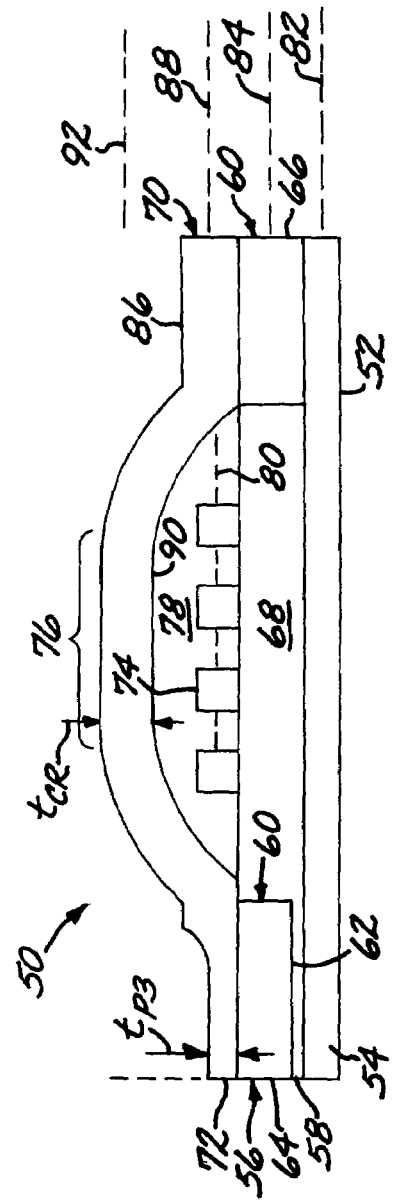

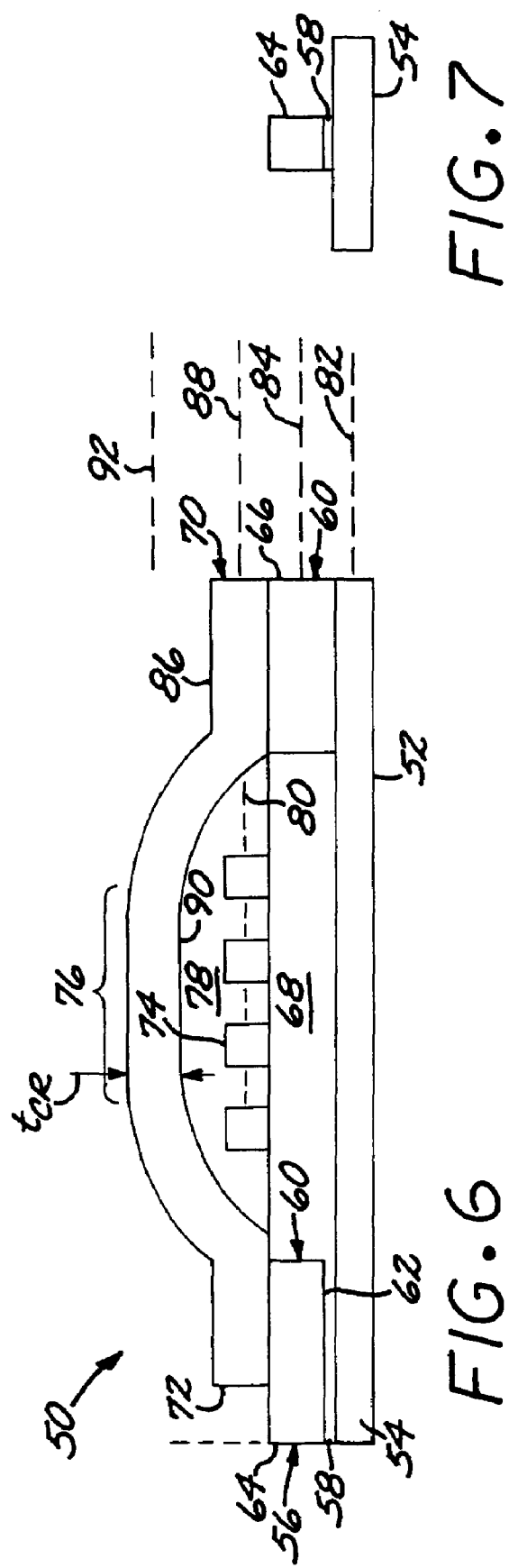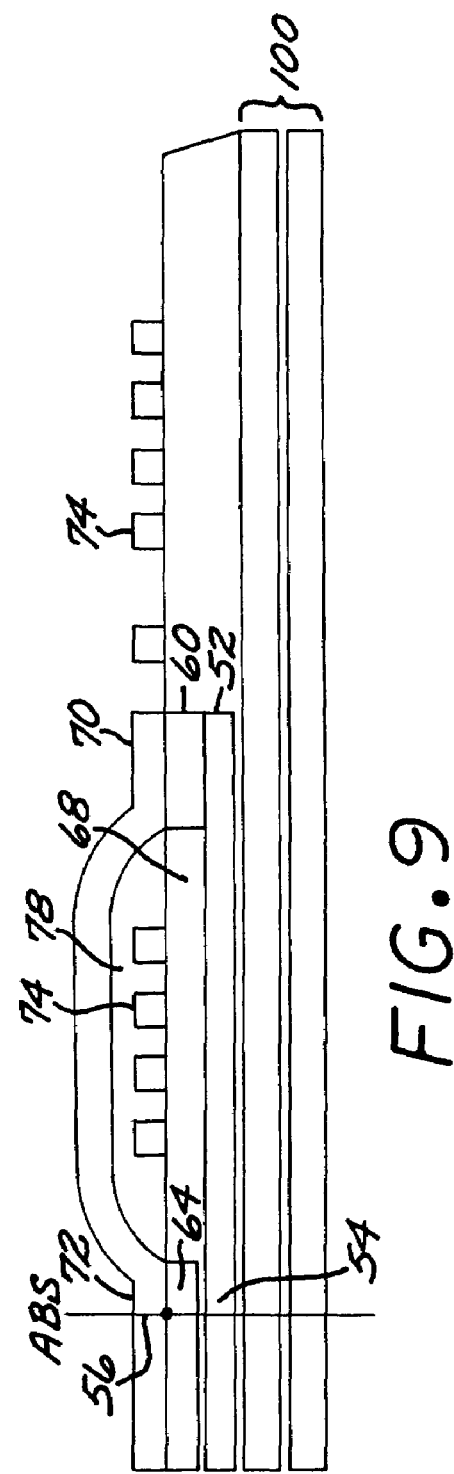

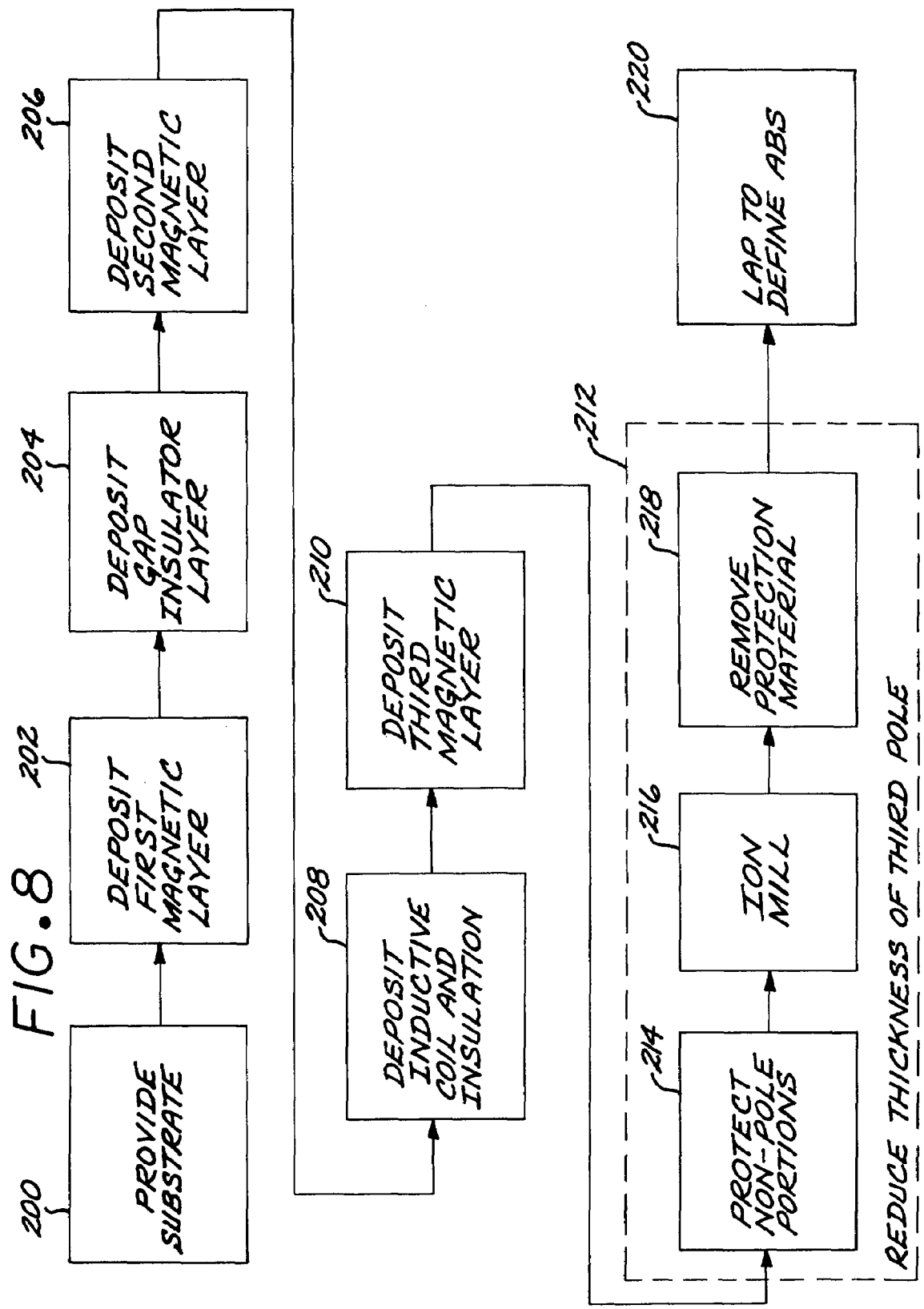

MAGNETIC HEAD WITH MAGNETIC LAYERS OF DIFFERING WIDTHS AND THIRD POLE WITH REDUCED THICKNESS

BACKGROUND OF THE INVENTION

1. Field of the Invention

This invention relates to magnetic heads and, more particularly, to a write head with a T-shaped write pole.

2. Background of the Invention

A write head is used in a magnetic read/write device to write a magnetic bit onto a recording medium of a magnetic storage device. An example is the read/write head of a computer hard disk, which is positioned closely adjacent to the recording medium and separated from the recording medium by an air bearing. A data bit is written onto an area of the recording medium, typically a track moved past the read/write head, using the writing portion of the read/write head by locally changing the magnetic state of the recording medium. That magnetic state is later sensed by the read sensor to read the data. The write structure and the read structure are usually integrated together in a read/write head.

In one design, the write structure includes a small-scale horseshoe-like electromagnet with the poles oriented perpendicular to the air bearing surface (ABS) of the read write head. Because of the small size, the electromagnet, including the legs of the horseshoe, the pole layers, the inductive coil, and the related structure, are fabricated by microelectronic techniques as multilayered structure. The poles at the ends of the legs and adjacent to the ABS are typically designated as the lower pole (also called first pole, or P1 pole) and upper pole (also called second pole, or P2 pole.) A continuing trend in the industry is to make the tracks in the recording medium ever narrower, so that more information may be stored on the recording medium.

In order to write onto a narrow track on the recording medium, the upper pole is made very narrow and has reached submicron widths in current writing devices. To reach even smaller sized, a wider third pole (P3) layer may be added to support and aid in the fabrication of the upper pole layer. Viewed from the ABS. the third pole and upper (P2) layer together have a T-shape, with the wider third pole layer forming the crosspiece of the T. T-shaped pole piece structures are known in the art and are described, for example, in U.S. Pat. No. 5,283,942.

Although the T-head structure successfully allows the fabrication and use of the narrower P2 pole layer for writing onto ever narrower tracks in the recording medium, the inventors have observed other problems in the work leading to the present invention. Specifically, the T-head structure may perform "corner writing", an unintended alteration of the recording medium off of the intended track. There is a need for an approach to avoid corner writing, while at the same time realizing the benefits of the T-head write structure. The present invention fulfills this need, and further provides related advantages.

SUMMARY OF THE INVENTION

The present invention provides a magnetic head having a T-head magnetic write structure. The P2 pole of the T-head may be made quite narrow, so that information may be written to narrow tracks on the recording medium. The structure of the T-head is modified to minimize corner writing, without interfering with the flow of the magnetic flux to the P2 pole. The magnetic head may be fabricated using fine-scale manufacturing techniques known in the art for other purposes.

In accordance with the invention, a magnetic head comprises a magnetic write structure, itself comprising a first magnetic layer having a first (P1) pole, a second magnetic layer having a second (P2) pole, a second magnetic layer having a second (P2) pole space apart from the first pole, and a third magnetic layer having a third (P3) pole contacting the second pole. The third pole has a third-pole width greater than a second-pole width. An electrically insulated inductive coil is positioned adjacent to the third magnetic layer (as well as the first magnetic layer and the second magnetic layer), and is disposed between the first magnetic layer and the third magnetic layer. The inductive coil is in registry with the third magnetic layer at a coil-registry location remote from the third pole.

The third magnetic layer is nonuniformly thick such that a thickness of the third pole is less than a thickness of the third layer at the coil-registry location. Desirably, the first magnetic layer and the second magnetic layer are each substantially planar, the inductive coil is substantially planar, and the third magnetic layer is nonplanar.

Stated alternatively, a magnetic head includes a magnetic write structure having an ABS end thereof and comprising a first magnetic layer having a first pole at the ABS end thereof, and a second magnetic layer having a second pole at the ABS end thereof. The second pole is spaced apart from the first pole and has a second-pole width. A third magnetic layer has a third pole at the ABS end thereof, with the third pole contacting the second pole and having a third-pole width greater than the second pole width so that the second magnetic layer and the third magnetic layer taken together have a T-shape when viewed from the ABS end. An inductive coil is disposed adjacent to and in registry with the third magnetic layer at a coil-registry location remote from the third pole. The third magnetic layer passes through the inductive coil. The third magnetic layer is nonuniformly thick such that a thickness of the third pole is less than a thickness of the third layer at the coil-registry location. Compatible features discussed in relation to other embodiments may be used with this embodiment.

In one form of the magnetic head, the inductive coil is substantially planar and lies in an inductive-coil lane, the first magnetic layer is substantially planar and lies in a first-magnetic-layer plane parallel to and below the inductive-coil plane, and the second magnetic layer is substantially planar and in a second-magnetic layer plane parallel to and below the inductive-coil plane. The third magnetic layer is nonplanar, with a first portion remote from the third pole and lying in a first-portion plane substantially coincident with the inductive-coil plane, and a second portion lying in a second portion plane parallel to and above the inductive-coil plane. The coil registry location is within the second portion of the third magnetic layer.

A method of fabricating a magnetic head having a magnetic write structure comprises the steps of providing a substrate, depositing on the substrate a first magnetic layer having a first pole, and depositing a gap insulator layer on the first magnetic layer. A second magnetic layer is deposited overlying the gap insulator layer. The second magnetic layer includes a second magnetic layer portion having a second pole thereon with a second-pole width, and a second layer insulator portion. The method further includes depositing and electrically insulated inductive coil overlying the second-layer insulator portion, and depositing over the electrically insulated inductive coil a third magnetic layer having a non-pole portion and a third pole contacting the second pole. The third pole has a third pole width greater than the second-pole width. A thickness of the third pole is less than a thickness of the non-pole portion. Compatible features discussed in relation to other embodiments may be used with this method.

The step of depositing over the inductive coil a third magnetic layer preferably includes the steps of depositing the third magnetic layer of substantially uniform thickness, and removing a portion of the thickness of the third pole. The removing may be accomplished by masking the non-pole portions of the third layer, and removing material from the third pole by any operable technique, with ion milling preferred.

The present approach produces a T-head structure with a reduced thickness of the third (P3) pole layer, as compared to the thickness of the third magnetic layer of which it is a part. Side writing is reduced in this structure, as compared with a structure in which the thickness of the third pole is not reduced. Reduction of the thickness by removing a portion of the third magnetic layer has the additional benefit that any side bumps and residual P3 seed layer are removed. The incidence of alumina cracking in the overlying alumina insulation is also reduced.

Other features and advantages of the present invention will be apparent from the following more detailed description of the preferred embodiment, taken in conjunction with the accompanying drawings, not necessarily to scale, which illustrate, by way of example, the principles of the invention. the scope of the invention is not, however, limited to this preferred embodiment.

BRIEF DESCRIPTION OF THE DRAWINGS

FIG. 2 is a schematic side sectional view of a write head in which the thickness of the P3 layer is not reduced;

FIG. 3 is a schematic end elevational view of the structure of FIG. 2;

FIG. 4 is a schematic side sectional view of a write head according to the present approach;

FIG. 5 is a schematic end elevational view of the structure of FIG. 4;

FIG. 6 is a schematic side sectional view of a write head with an end-notched P3 layer;

FIG. 7 is a schematic end elevational view of the structure of FIG. 6;

FIG. 8 is a block flow diagram of a preferred approach for fabricating a magnetic write structure;

FIGS. 9–11 are schematic side sectional views of the write structure at various stages of the fabrication process of FIG. 8.

DETAILED DESCRIPTION OF THE PREFERRED EMBODIMENTS

Figure 1:
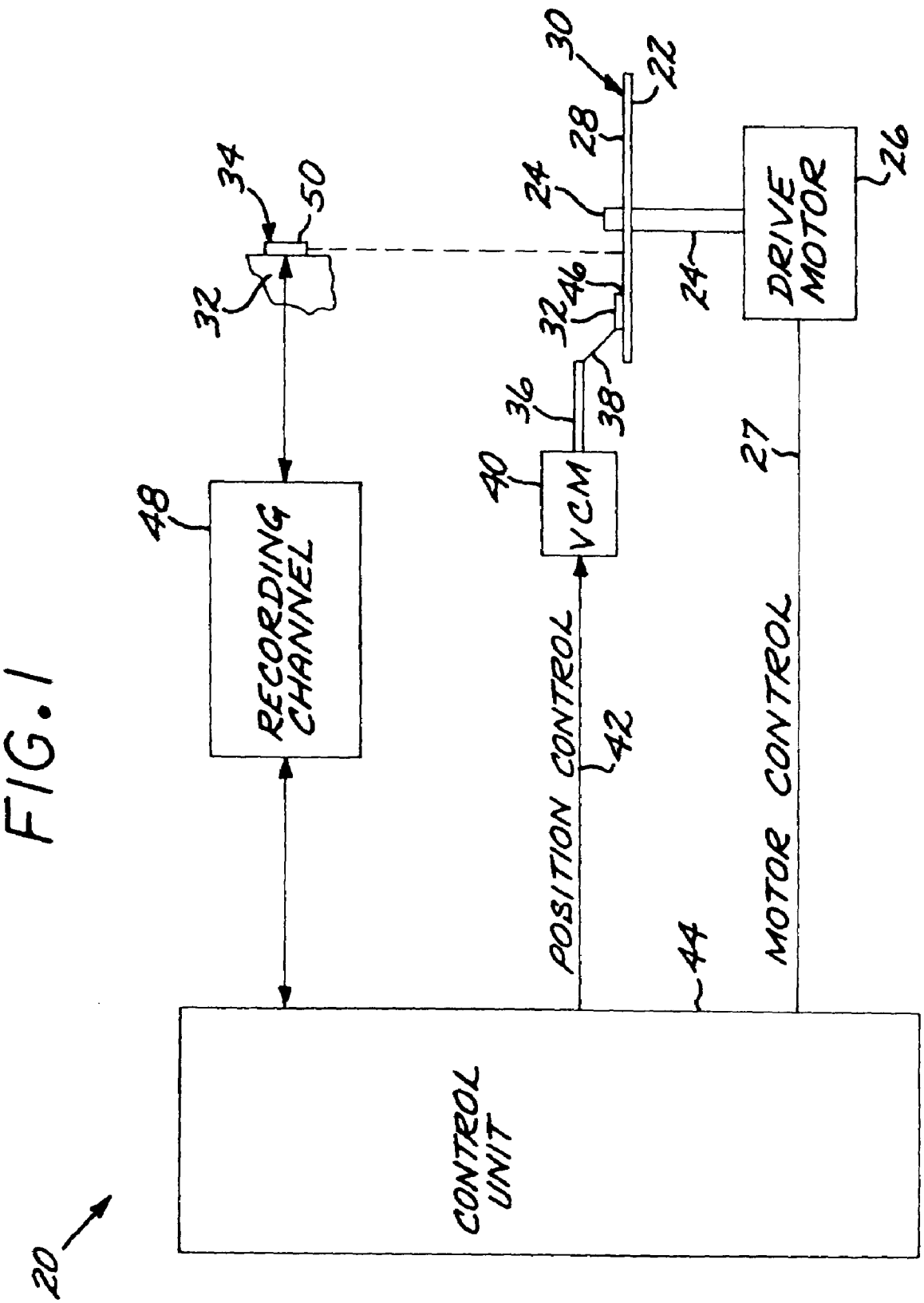
FIG. 1 is a schematic diagram of a magnetic disk data storage system.

FIG. 1 shows a data storage system, here depicted as a magnetic disk drive system 20, with which the present approach may be used. The magnetic disk drive system 20 includes a rotatable magnetic storage disk 22 that is supported on a spindle 24 and rotated by a disk drive motor 26 under motor control 27 of a control unit 44. A magnetic storage medium 28 is deposited on a surface 30 of the magnetic storage disk 22.

A slider 32 is positioned in facing relation to the magnetic storage disk 22. The slider 32 supports at least one read/write magnetic head 34 in facing relation to the magnetic storage medium 28 of the magnetic storage disk 22. The slider 32 is mounted to an actuator arm 36 by a suspension 38. The actuator arm 36 and the slider 32 move radially inwardly and outwardly so that the combined inward/outward motion of the slider 32 and the rotation of the magnetic storage disk 22 allows the read/write head 34 to be placed into facing relation to any selected portion of the entire area of the magnetic storage medium. The actuator arm 36 is driven by an actuator 40 (depicted as a voice coil motor or VCM) under the radial position control 42 of the control unit 44.

The suspension 38 generates a slight spring force which biases the slider 32 toward the surface 30 of the magnetic storage disk 22. During sensor operation the magnetic storage disk 22 turns, and an air bearing is created between the downwardly facing surface of the slider 32, termed the air bearing surface 46 or ABS, and the upwardly facing surface 30 of the magnetic storage disk 22. (Only the downwardly oriented slider is illustrated, but there may also or instead be an upwardly oriented slider facing the bottom side of the magnetic storage disk.) The air bearing counterbalances the slight spring force of the suspension 38 and supports the slider 32 a small distance above the surface 30 with a small, substantially constant separation.

The read/write head 34 writes data onto the magnetic storage medium 28 by altering magnetic states in the magnetic storage medium, and also reads data from the magnetic storage medium 28 by sensing the magnetic states in the magnetic storage medium 28. The writing and reading commands, as well as the data to be written or read, are transmitted between the control unit 44 and the read/write head 34 over a recording channel 48. The present approach is concerned with a magnetic write structure that is part of the read/write head 34.

The preceding discussion is a simplified description of the data storage system in the form of the magnetic disk drive system 20, to establish the environment in which the present invention is used. The present invention is also applicable to other types of magnetic data storage systems such as tape drives and their read/write heads.

FIGS. 2–3 depict a prior-art head 50 in which the thickness tp3 of the third pole 72 in the pole tip region has not been reduced. The write head 50 includes a substantially planar first magnetic layer 52 forming a first pole (P1) 54 and including a pole tip region 54. The write head further includes a second magnetic layer, including two sections, the first section defining a second pole P2 64 adjacent to an air bearing surface ABS 56, and the second section defining a back gap portion 66 at an end opposite P2 64. The P2 portion 64 is separated from P1 54 by a thin non-magnetic write gap layer 58, whereas the back gap portion 66 contacts P1 54. A third magnetic layer 70 has a third (P3) pole 72 adjacent to the ABS 56 and contacting the second pole 64. As seen in FIG. 2, the third magnetic layer 70 is of substantially uniform thickness throughout.

An electrically insulated inductive coil 74 is positioned adjacent to the third magnetic layer 70 to controllably magnetize the third magnetic layer 70, as well as the first magnetic layer 52 and the third magnetic layer 70, when an electrical current is passed through the inductive coil 74. The inductive coil 74 is disposed between the first magnetic layer 52 and the third magnetic layer 70 over a coil-registry location 76 remote from the third pole 72. The inductive coil 74 is electrically insulated from contact with the magnetic layers 52 and 70, and the layer portions 60, 64, and 66, by the second layer insulator portion 68 and the coil insulation 78.

The inductive coil 74 is a multi-turn pancake coil that is substantially planar and lies in an inductive-coil plane 80. The first magnetic layer 52 is substantially planar and lies in a first magnetic layer plane 80. The second magnetic layer 60 is substantially planar and lies in a second-magnetic layer plane 84 parallel to and below the inductive-coil plane 80. The third magnetic layer 70 is nonplanar, with the third pole tip portion 72 and a buried portion 86 remote from the third pole 72, both lying in a buried-portion plane 88 substantially coincident with the inductive-coil plane 80. The coil-registry location 76 is within the coil-registry portion 90 of the third magnetic layer 70. The buried portion 86 of the third magnetic layer 70 contacts the facing portion of the back gap layer portion 66 of the second magnetic layer 60, which in turn contacts the facing portion of the first magnetic layer 52, thereby forming a portion of a magnetic circuit when the inductive coil 74 is activated.

The "thickness" of any of the structural elements in FIGS. 2–3 is a dimension measured perpendicular to the parallel planes 80, 82, 84, 88, or 92. In this case, the third magnetic layer 70 is substantially uniformly thick, with a thickness of the third pole 72, tp3, about the same as a thickness of the coil-registry portion 90 of the third magnetic layer 70, $t_{cr}$.

The "width" of any of the structural elements in FIGS. 2–3 is a dimension measured parallel to the plane of any of the parallel planes 80, 82, 84, 88, or 92, and parallel to the air bearing surface 56 (i.e., perpendicular to the plane of the illustration of FIG. 2). The width dimension may be most readily visualized from the end elevational view from the air bearing surface 56, as seen in FIG. 3. In this case, the width of the third pole 72, Wp3, is greater than the width of the second pole 64, Wp2. This results in the T-head write structure that may be seen most clearly in FIG. 3, where the third pole 72 forms the cross piece of the T, and the second pole 64 forms the vertical part of the T.

The T-head write structure of FIGS. 2–3, while operable, has some shortcomings. The function of the write structure is to alter the magnetic state on a track of the storage medium 28 (FIG. 10 directly adjacent to the second pole 64. However, in the T-head design of FIGS. 2–3, the prominent third pole 72 is prone to corner writing, wherein the magnetic state of a track laterally adjacent to the third pole 72 is also altered. The corner writing may degrade previously written adjacent tracks, and also has the effect of preventing narrow track definition. The T-head design of FIGS. 2–3 also may produce cracking in the overlying aluminum oxide insulation.

The incidence of these problems is reduced by an approach illustrated in FIGS. 4–5. In FIGS. 4–5, features common with FIGS. 2–3 have been assigned the same reference numerals, and the prior description is incorporated here. In the approach of FIGS. 4–5, the thickness tp3 of the third pole 72 is reduced as compared with the thickness tcr of the coil registry portion 90 of the third magnetic layer 70.

The resulting structure remains a T-head write structure, as illustrated in FIG. 5, but the thickness of the third pole 72 is reduced. The thinner third pole 72 reduces the incidence of corner writing and alumina cracking.

The approach of FIGS. 4–5 may be compared with an alternative approach illustrated in FIGS. 6–7 that is not by itself within the scope of the invention. In FIGS. 6–7, features common with FIGS. 2–3 and 4–5 have been assigned the same reference numerals, and the prior description is incorporated here. In the approach of FIGS. 6–7, the third pole 72 is recessed back and away from the air bearing surface 56. The structure reduces corner writing, but it also reduces the length over which magnetic flux transfers from the third magnetic layer 70 to the second pole 64 of the second magnetic layer 60, resulting in a loss of efficiency of the writing function between the first pole 54 and the second pole 64. The present approach of FIGS. 4–5 may be used in conjunction with some recessing of the third pole 72 as in FIGS. 6–7, if desired, but this configuration is not preferred.

Figure 10:
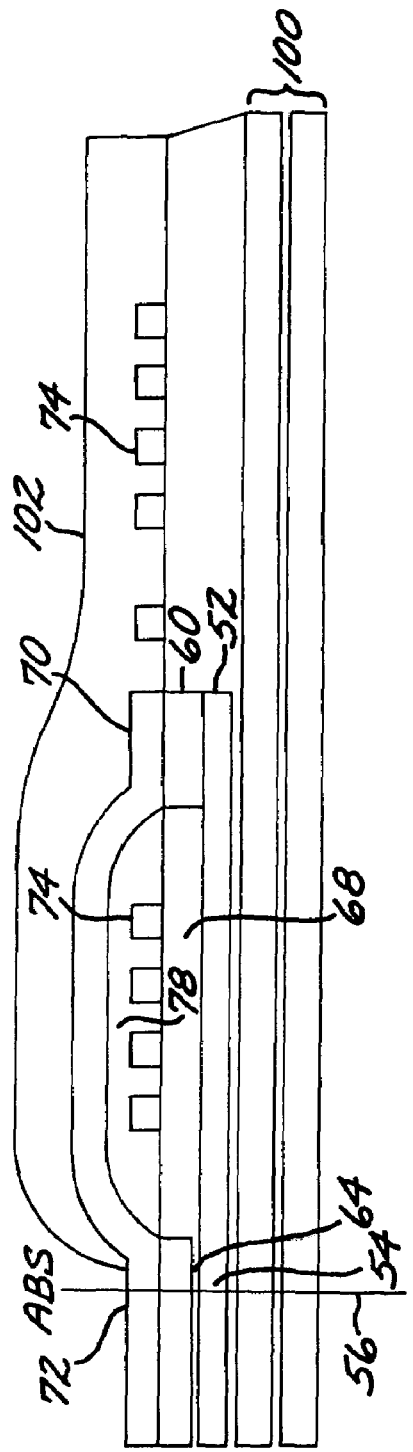
Figure 11:
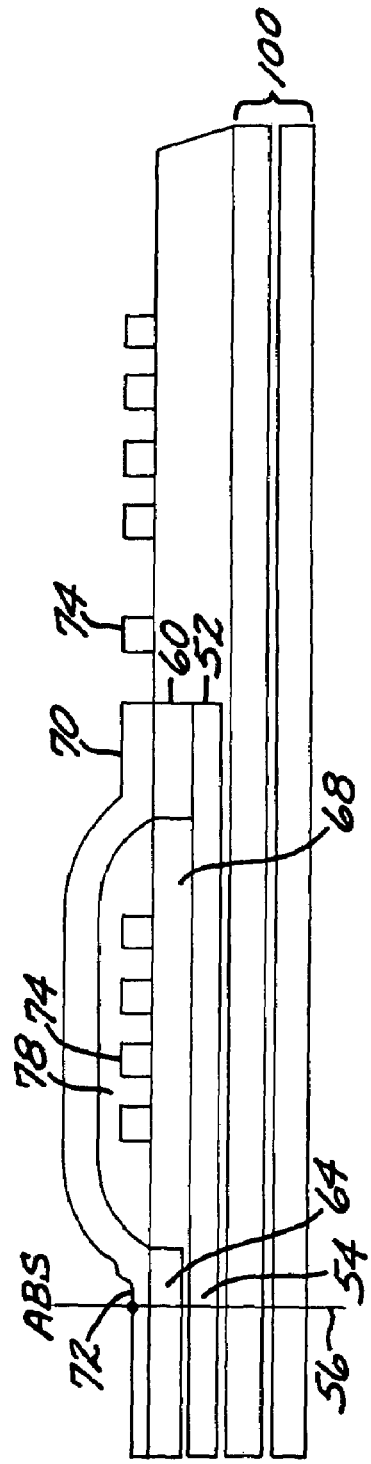

FIG. 8 depicts in simplified form an approach for fabricating a magnetic head comprising a magnetic write structure 50 whose final form is illustrated in FIGS. 4–5. FIGS. 9–11 illustrate the structure at various stages of the fabrication processing, with the prior description incorporated, but with some identifying characters omitted for clarity. A substrate 100 is provided, numeral 200. The substrate 100 upon which subsequent structure is formed preferably comprises a read portion of the read/write magnetic head 34, so that an integrated head to perform both reading and writing functions is produced. The write portion or head thus overlies and contacts the read portion or head of the read/write magnetic head 34. See, for example, U.S. Pat. No. 5,486,968, whose disclosure is incorporated by reference.

A first magnetic layer 52 having the first pole 54 is deposited upon the substrate 100, numeral 202. The gap insulator layer 58 is deposited on the first magnetic layer 52, numeral 204. The second magnetic layer 60 is deposited overlying the gap insulator layer 58, numeral 206. The second magnetic layer 60 includes the second magnetic layer portion 62 having the second pole 64 thereon. The second layer insulator portion 68, and the back gap layer portion 66. The second magnetic layer 60 has a planar upper surface after deposition 206. The inductive coil 74 and its coil insulation 78 are deposited over the second-layer insulator portion 66 of the second magnetic layer 60, numeral 208.

The third magnetic layer 70, having the third pole 72 and a non-pole portion (the non-pole portion being all of the third magnetic layer 70 except for the third pole 72), is deposited over the inductive coil 74 and the remaining exposed portion of the second magnetic layer 60, numeral 210. The deposited third pole 72 contacts the previously deposited second pole 64. FIG. 9 depicts the structure at this stage of the fabrication processing.

The third magnetic layer 70 is preferably deposited in substantially a uniform thickness, and thereafter the thickness of the third pole 72 is reduced, numeral 212. The reduction step 212 is preferably performed by making the non-pole portions of the third magnetic layer 70 with a protection layer 102, numeral 214 and as shown in FIG. 10. Material is then removed from the third pole 72 to reduce its thickness tp3, numeral 216. The material removal step 216 is preferably performed by ion milling material from the third pole 7. The remaining protection layer 102 is removed when the reduction step 212 is complete, numeral 218. FIG. 11 illustrates the resulting read/write head 34 that includes the write head 50 as also seen in FIGS. 4–5, and also the read head that acted as the substrate 100. The thickness of the third pole 72 is less than that of the remainder of the third magnetic layer 70 as a result of the thickness reduction 212. Lastly, the structure of FIG. 11 is lapped from the left to remove the material to the left of the line "ABS", numeral 220, thereby defining the location of the air bearing surface 56.

Alternatively to this approach shown in FIG. 8, but reaching an equivalent result, the third magnetic layer 70 may be initially deposited so that the thickness of the third pole 72 is less than that of the remainder of the third magnetic layer 70. Such a deposition is more difficult to accomplish while achieving precise thickness, as compared with the approach of FIG. 8.

The present approach may be practiced with any combination of operable layers, configurations, materials, and thickness. The preferred approach is that illustrated herein, but the invention is not so limited. In the preferred approach, the substrate 100 is a magnetoresistance (MR) sensor such as a giant magnetoresistance (GMR) sensor described, for example, in U.S. Pat. No. 5,436,778, or a tunnel magnetoresistance (TMR) sensor described, for example, in U.S. Pat. No. 5,729,410, both of whose disclosures are incorporated by reference. In one embodiment, the magnetic layers 52, 60, and 70 are made of a magnetic material such as NiFe, CoNiFe, or rare earth-NiFe alloy, deposited by electroplating or sputtering. The first magnetic layer 52 is typically from about 1–3 micrometers thick, the second magnetic layer 60 is typically from about 0.5–3 micrometers thick, and the third magnetic layer 70 is typically from about 0.5–3 micrometers thick. The second layer insulator portion 68 is preferably alumina, and the coil insulation 78 is preferably a thermally cured, hard-baked photoresist material. The inductive coil is copper. The protective layer 102 is a photoresist that is patterned to reveal the region to be ion milled in step 216.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A magnetic write head comprising a magnetic write structure having an ABS end thereof, the magnetic write structure comprising:
    A first magnetic layer having a first pole at the ABS end thereof;
    A second magnetic layer having a second pole at the ABS end thereof, the second pole being spaced apart from the first pole and having a second-pole width;
    A third magnetic layer formed indenendently of the second pole and having a third pole at the ABS end thereof, the third pole contacting the second pole and having a third-pole width greater than the second-pole width so that the second magnetic layer and the third magnetic layer taken together have a T-shape when viewed from the ABS end; and
    An inductive coil disposed adjacent to and in registry with the third magnetic layer at a coil-registry location remote from the third pole, a plane of the third magnetic layer defined between the third pole and a buried portion of the third magnetic layer passing through the inductive coil, wherein the third magnetic layer is nonuniformly thick such that a thickness of the third pole is less than a thickness of the third magnetic layer along all points of the coil-registry location,
    wherein:
    The inductive coil is substantially planar and lies in an inductive-coil plane;
    The first magnetic layer is substantially planar and lies in a first-magnetic layer plane parallel to and below the inductive-coil plane,
    The second magnetic layer is substantially planar and lies in a second magnetic layer plane parallel to and below the inductive coil plane;
    The third magnetic layer is nonplanar. with the third pole and a back gap layer portion remote from the third pole both lying in a buried-portion plane substantially coincident with the inductive-coil, and
    A coil-registry portion lying in a coil-registry portion plane parallel to and above the inductive-coil plane. and wherein the coil-registry location is within the coil registry portion of the third magnetic layer.

2. A magnetic head comprising a magnetic write structure having an ABS end thereof, the magnetic write structure comprising:
    A first magnetic layer having a first pole at the ABS end thereof;
    A second magnetic layer having a second pole at the ABS end thereof, the second pole being spaced apart from the first pole and having a second-pole width;
    A third magnetic layer formed independently of the second pole and having a third pole at the ABS end thereof, the third pole contacting the second pole and having a third-pole width greater than the second-pole width so that the second magnetic layer and the third magnetic layer taken together have a T-shape when viewed from the ABS end; and
    An inductive coil disposed adjacent to and in registry with the third magnetic layer at a coil-registry location remote from the third pole, a plane of the third magnetic layer defined between the third pole and a buried portion of the third magnetic layer passing through the inductive coil, wherein the third magnetic layer is nonuniformly thick such that a thickness of the third pole is less than a thickness of the third magnetic layer along all points of the coil-registry location.
    wherein material has been removed from the third pole for defining the thickness thereof,
    wherein:
    The inductive coil is substantially planar and lies in an inductive-coil plane;
    The first magnetic layer is substantially planar and lies in a first-magnetic layer plane parallel to and below the inductive-coil plane,
    The second magnetic layer is substantially planar and lies in a second magnetic layer plane parallel to and below the inductive coil plane;
    The third magnetic layer is nonpianar, with the third pole and a back gap layer portion remote from the third pole both lying in a buried-portion plane substantially coincident with the inductive-coil, and
    A coil-registry portion lying in a coil-registry portion plane parallel to and above the inductive-coil plane, and wherein the coil-registry location is within the coil registry portion of the third magnetic layer.

3. A magnetic head as recited in claim 2, wherein a portion of the inductive coil passes between the first magnetic layer and the third magnetic layer, the inductive coil having a substantially planar first surface that is coplanar with a plane defined by an interface between the second magnetic layer and the third magnetic layer.

4. A magnetic head as recited in claim 3 further comprising, non-magnetic, electrically insulative material separating said inductive coil from said first, second, and third magnetic layers.

5. A magnetic head as recited in claim 2, wherein said first and second magnetic layers are magnetically connected with one another in a back gap region.

6. A magnetic head as recited in claim 2, wherein the material of the third pole has been removed towards the air bearing surface thereof for reducing the thickness of the third magnetic layer towards the air bearing surface.

7. The magnetic head of claim 2, further including a gap insulator disposed between the first pole and the second pole.

8. The magnetic head of claim 2, further including electrical insulation lying between the inductive coil and the adjacent first magnetic layer and third magnetic layer.

9. A magnetic head as recited in claim 2, wherein the third magnetic layer is recessed from a plane extending along an air bearing surface of the first and second magnetic layers.

* * * * *

UNITED STATES PATENT AND TRADEMARK OFFICE
CERTIFICATE OF CORRECTION

| | |
|---|---|
| PATENT NO. | : 7,092,206 B2 |
| APPLICATION NO. | : 10/606427 |
| DATED | : August 15, 2006 |
| INVENTOR(S) | : Hsiao et al. |

It is certified that error appears in the above-identified patent and that said Letters Patent is hereby corrected as shown below:

In the claims:
col. 7, line 18 change "indenendently" to --independently--;
col. 8, line 26 change "nonpianar" to --nonplanar--;

Signed and Sealed this

Twenty-sixth Day of December, 2006

JON W. DUDAS
*Director of the United States Patent and Trademark Office*